Oct. 25, 1966　　F. C. I. MARCHANT ET AL　　3,280,560
AIRCRAFT JET PROPULSION POWER PLANT
Filed Oct. 26, 1964　　7 Sheets-Sheet 1
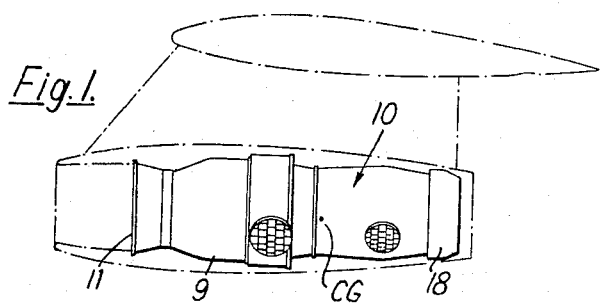
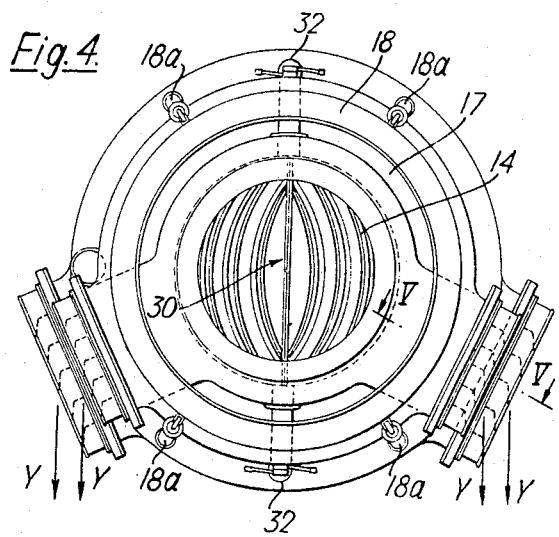
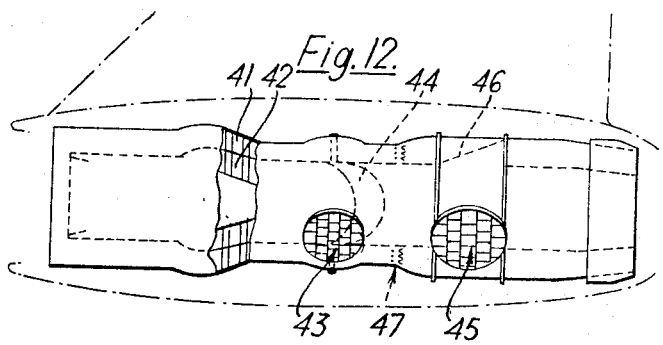
Inventors
FRANCIS CHARLES IVOR MARCHANT
SAMUEL ROBINSON
FREDERICK IVENS CLARK
By Bailey, Stephens Huettig
Attorneys

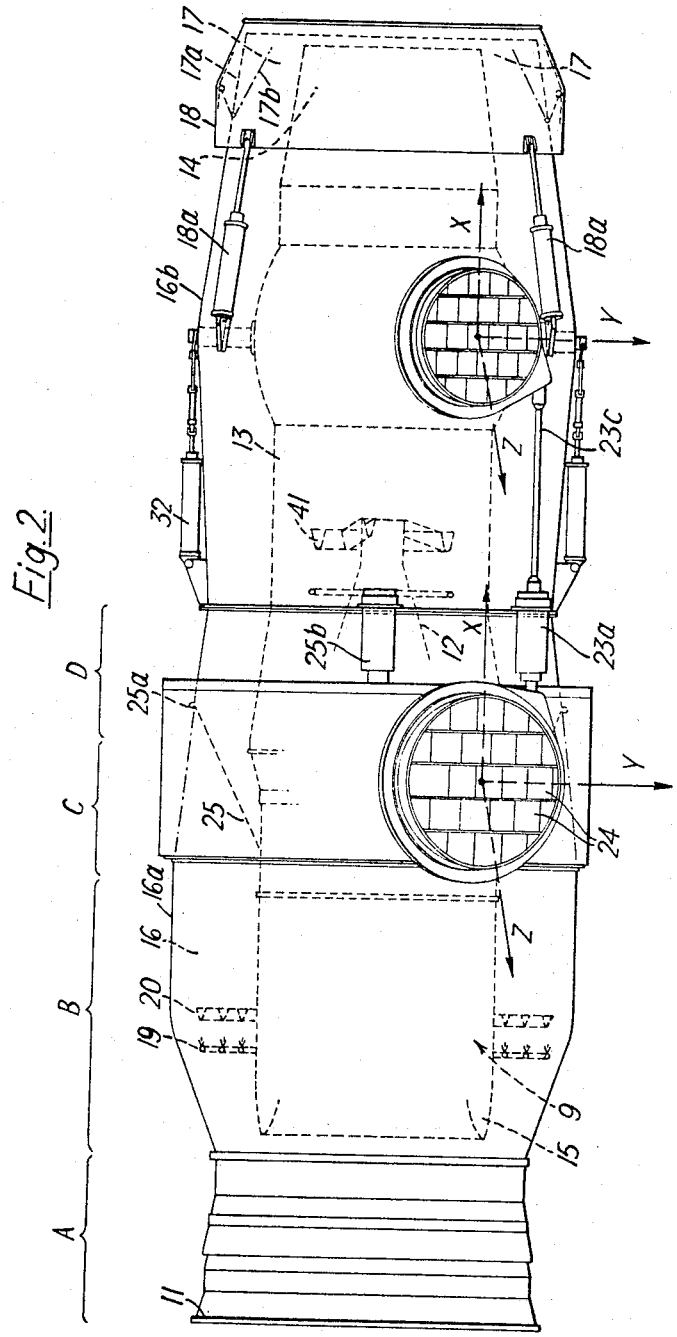

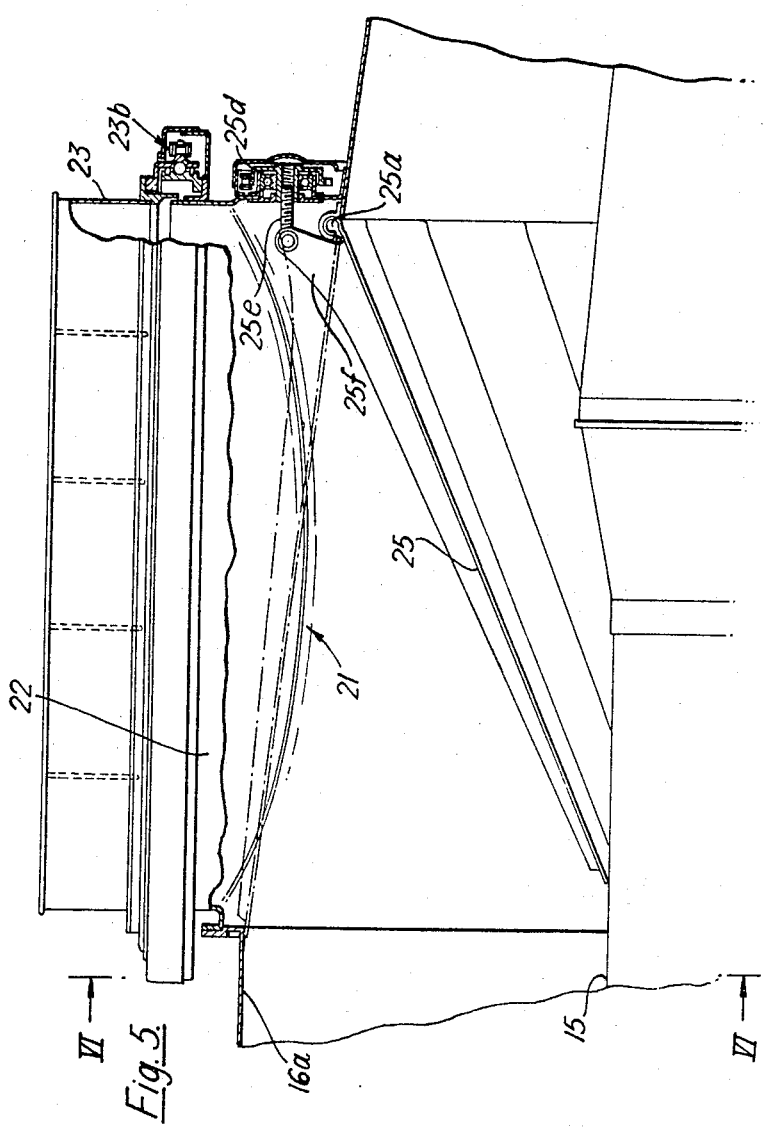

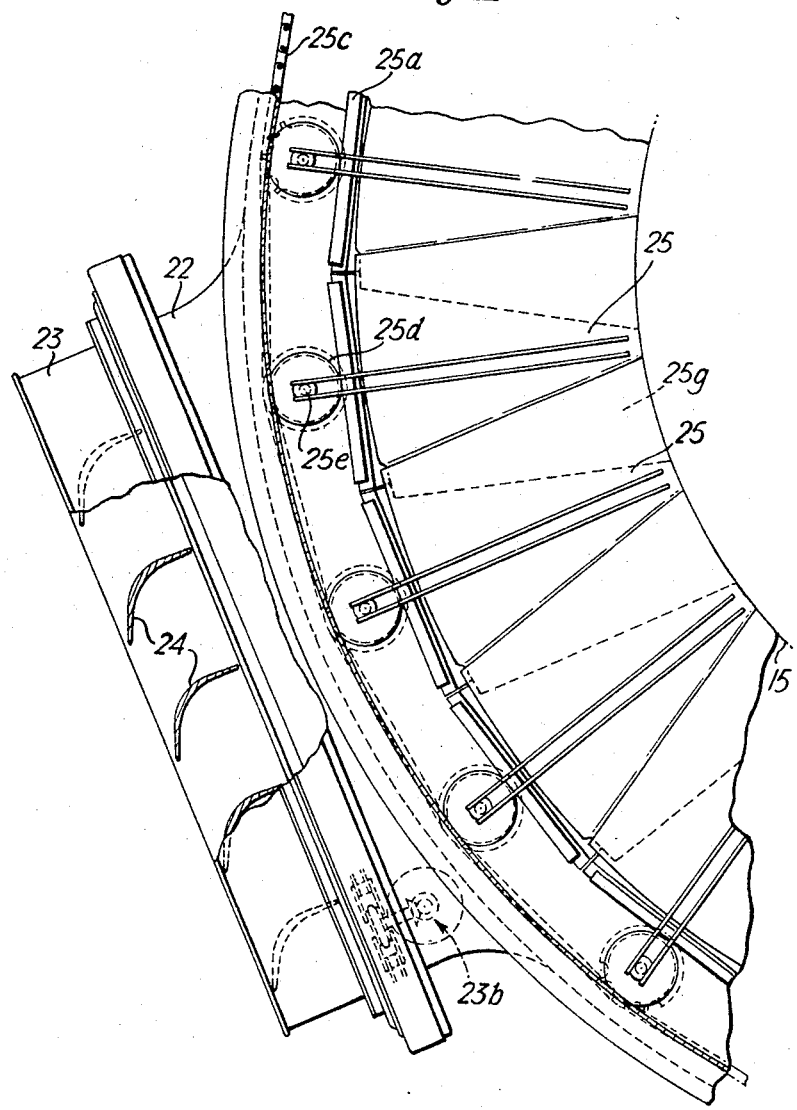

Inventors
FRANCIS CHARLES IVOR MARCHANT
SAMUEL ROBINSON
FREDERICK IVENS CLARK

By *Lailey, Stephens &*
*Luetta*
Attorneys

Oct. 25, 1966   F. C. I. MARCHANT ET AL   3,280,560
AIRCRAFT JET PROPULSION POWER PLANT
Filed Oct. 26, 1964   7 Sheets-Sheet 7
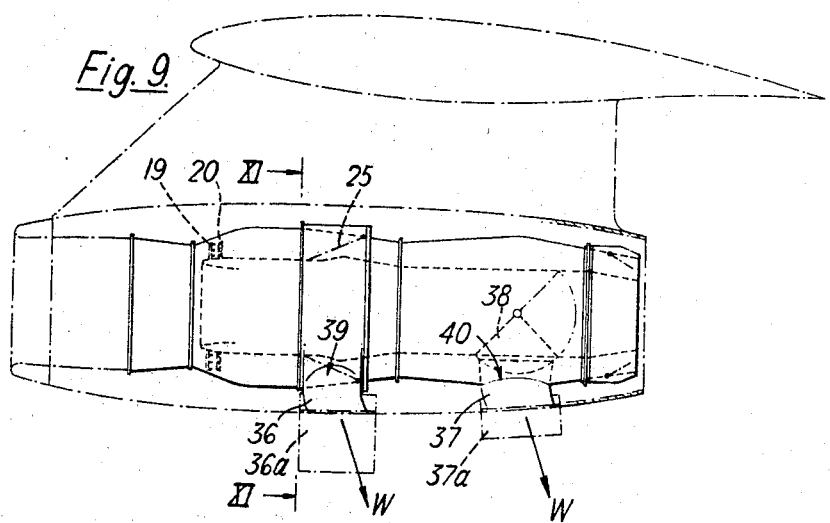
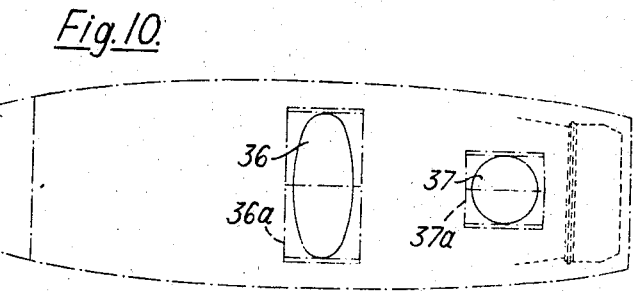
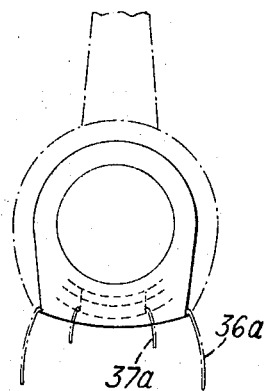
Inventors
FRANCIS CHARLES IVOR MARCHANT
SAMUEL ROBINSON CLARK
FREDERICK IVENS
By Bailey, Stephen Huettig
Attorneys United States Patent Office 3,280,560
Patented Oct. 25, 1966

3,280,560
AIRCRAFT JET PROPULSION POWER PLANT
Francis Charles Ivor Marchant, Samuel Robinson, and Frederick Ivens Clark, all of Bristol, England, assignors to Bristol Siddeley Engines Limited, Bristol, England, a British company
Filed Oct. 26, 1964, Ser. No. 406,486
Claims priority, application Great Britain, Oct. 28, 1963, 42,413/63
11 Claims. (Cl. 60—226)

This invention relates to gas turbine jet propulsion power plant for aircraft, of the kind in which the direction of the propulsion thrust may be varied relatively to the power plant by the selective use of alternative jet outlets. The invention may be used in V.T.O.L. (vertical take-off and landing) or S.T.O.L. (short take-off and landing aircraft.

According to the invention the power plant comprises a gas turbine engine including a jet pipe for the turbine exhaust gas which terminates in a jet nozzle for normal forward propulsion, an axial flow additional compressor driven by the engine, a by-pass air duct at least partly surrounding the engine and its jet pipe and communicating at its upstream end with the additional compressor and arranged to discharge through its downstream end for normal forward propulsion, an auxiliary combustion system for burning fuel in the air in the by-pass duct, at least one alternative outlet in the outer wall of the by-pass duct downstream of the auxiliary combustion system and communicating with a branch discharge duct, valve means movable between a position in which it closes the alternative outlet and a position in which it diverts the flow from the by-pass duct through the alternative outlet, at least one further alternative outlet in the wall of the jet pipe and communicating with a further branch discharge duct, and further valve means movable between a position in which it closes the further alternative outlet and a position in which it diverts the turbine exhaust gas through the further alternative outlet.

There may be a single alternative outlet from the by-pass duct and a single alternative outlet from the jet pipe, but preferably there are pairs of outlets.

Preferably the additional compressor is located upstream of the engine and the alternative outlet of the by-pass duct is located upstream of the further alternative outlet of the jet pipe.

Preferably the alternative outlets lead to means for deflecting the discharge between downward and rearward directions.

According to another aspect of the invention, a method of operating a winged aircraft propelled by at least one gas turbine jet propulsion engine of the by-pass kind comprises the steps of operating the engine, including burning fuel in the by-pass duct, and discharging the by-pass gas and turbine exhaust gas downwards from valve-controlled alternative outlets to lift the aircraft into the air; thereafter deflecting such discharge rearwards to provide forward thrust; and thereafter closing the alternative outlets to cause the by-pass flow and turbine gas flow to be discharged rearwards through normal propulsion nozzle means and, before or after such closing of the alternative outlets, discontinuing the burning of fuel in the by-pass duct.

A preferred means for deflecting the discharges is rotatable nozzles, and in particular, rotatable nozzles in the form of rotatable rings carrying a grid of deflector vanes.

The accompanying diagrammatic drawings show examples of power plants and aircraft according to the present invention. In these drawings:

FIGURE 1 is a side view of a power plant housed in a pod beneath an aircraft wing;

FIGURES 2, 3 and 4 are respectively a side view, a plan, and a rear view of the power plant;

FIGURE 5 is a fragmentary section on the line V—V in FIGURE 4, on a larger scale;

FIGURE 6 is a fragmentary section on the line VI—VI in FIGURE 5;

FIGURE 9 is a side view of a second power plant housed in a pod;

FIGURE 10 is a view of the pod from beneath;

FIGURE 11 is a transverse section on the line XI—XI in FIGURE 9; and

FIGURE 12 is a side view of a third power plant.

Figure 3:
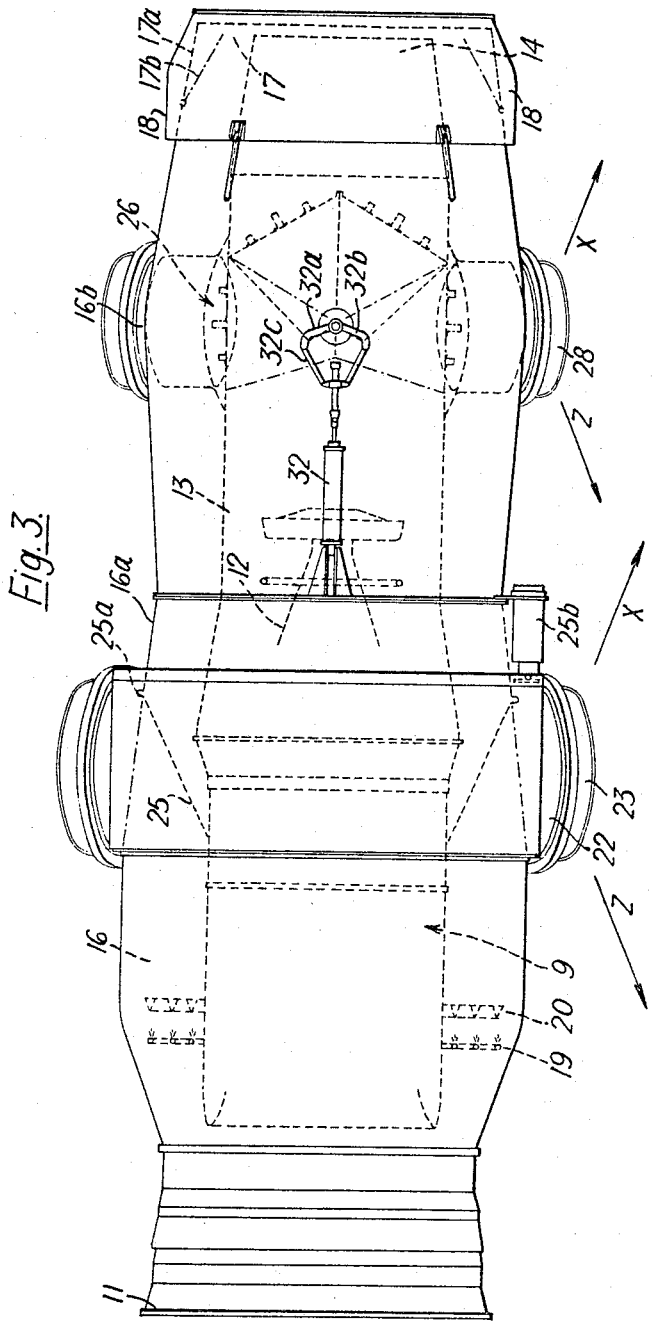

The power plant 10 shown in FIGURES 1 to 7 has a forward facing air intake 11 and includes a gas turbine engine 9, shown in dotted lines in FIGURES 2 and 3. An axial flow additional compressor in the form of a low pressure front fan is housed in a section A, a high pressure compressor is housed in a section B, a combustion system is housed in a section C and a turbine is housed in a section D, the turbine exhaust cone being indicated by reference 12. The turbine exhaust gas passes through a jet pipe 13 to be normally discharged from an inner rear nozzle 14 and thus provide forward thrust.

The air entering the intake 11 is compressed by the front fan in section A, and thereafter is divided by the engine casing 15 into an inner flow which passes through the engine, and an annular outer flow which enters a by-pass duct 16 surrounding the engine, and is normally discharged from an outer rear nozzle 17 surrounding the nozzle 14. The outer nozzle 17 is adjustable to vary its effective outlet area and for this purpose may comprise a ring of pivotable flaps 17a whose inward movement to a position 17b to reduce the outlet area is controlled by a frusto-conical shroud 18, movable axially by jacks 18a.

The by-pass duct 16 is provided with an auxiliary combustion system for burning fuel in the upstream end portion of the by-pass duct. This auxiliary combustion system is represented by annular rings of circumferentially-spaced fuel injectors 19 and flame-holders 20. Downstream of the auxiliary combustion system, the outer wall 16a of the by-pass duct is formed with port and starboard alternative outlets 21 which each communicate with an downward-inclined stub duct 22 terminating in a nozzle which takes the form of a ring 23 within which is mounted a grid of deflector vanes 24. The rings 23 are rotatably mounted on the ducts 22 so as to vary the direction of discharge from the nozzles between substantially rearward (X) for forward thrust, vertically downward (Y) for upthrust and substantially forward (Z) for braking thrust. Rotation of each ring 23 is controlled by a motor 23a (FIGURE 2) and bevel gear and chain drive 23b (FIGURES 5 and 6). In this example, the stub ducts 22 are inclined laterally downwards at 25° to the horizontal, and the vanes deflect the flow through 65°. Consequently the downward discharge (Y) is truly vertical, but the rearward discharge (X) has an outward component. This carries the discharge well clear of the outer wall 9 of the pod (FIGURE 1), even though, in order to minimize drag during forward flight, the rings 23 are arranged so as to have their outer faces substantially flush with the outer wall 9.

Valve means for selectively closing the outlets 21, or diverting flow from the by-pass duct 16 into the outlets 21, is constituted by an annular series of twenty four interconnected flaps 25 which are hinged at their downstream ends 25a to the outer wall 16a of the by-pass duct. In FIGURE 5, a flap 25 is shown in solid lines in the position in which the upstream ends of the flaps engage the engine casing 15 so that the whole flow from the by-pass duct 16 is diverted into the outlets 21, and in chain lines in the position in which the upstream ends of the flaps engage the outer wall 16a and so close the outlets 21 while permitting the whole flow to continue along the rear part of the by-pass duct 16 to the outer rear nozzle 17. To enable the flaps 25 to present a complete annulus in both extreme positions, they are arcuate in transverse section and adjacent side edges overlap one another as shown at 25g in FIGURE 6, one edge of each flap being joggled to permit this. Abreast of the outlets 21, there is a cylindrical enlarged portion of the by-pass duct. This provides space for the air to flow circumferentially to the outlets 21 when the flaps 15 are in the solid-line position.

The mechanism for controlling the flaps 25 comprising a motor 25b (FIGURES 2 and 3) acting on an endless chain 25c (FIGURE 6) arranged to drive a circumferential series of sprockets 25d which have threaded hubs and actuate a series of screws 25e (FIGURE 5), each of which is linked to a lever arm 25f projecting from a flap 25 adjacent to its hinge axis 25a.

The jet pipe wall 13a is formed with port and starboard alternative outlets 26 each of which communicates with a downwardly-inclined duct 27 terminating in a vaned nozzle ring 28, the construction and operation of which are substantially similar to the nozzles 23. The inclinations of the stub ducts 27 and of the vanes in the rings 28 are the same as those of the ducts 22 and rings 23, but the distance of the outer faces of the rings 28 from the engine axis is less, as can be seen particularly in FIGURE 4, and the radius of the pod outer wall 9 abreast of the rings 28 is correspondingly less than it is abreast of the rings 23. This arrangement helps to ensure that the rearward discharges (X) from the rings 23 and 28 will not interfere with one another. There may be some interference between substantially forward discharges (Z), but this does not matter greatly. The rings 28 are rotated by drives 23c (FIGURE 2) from the same motors as control the rings 23.

Figure 7:
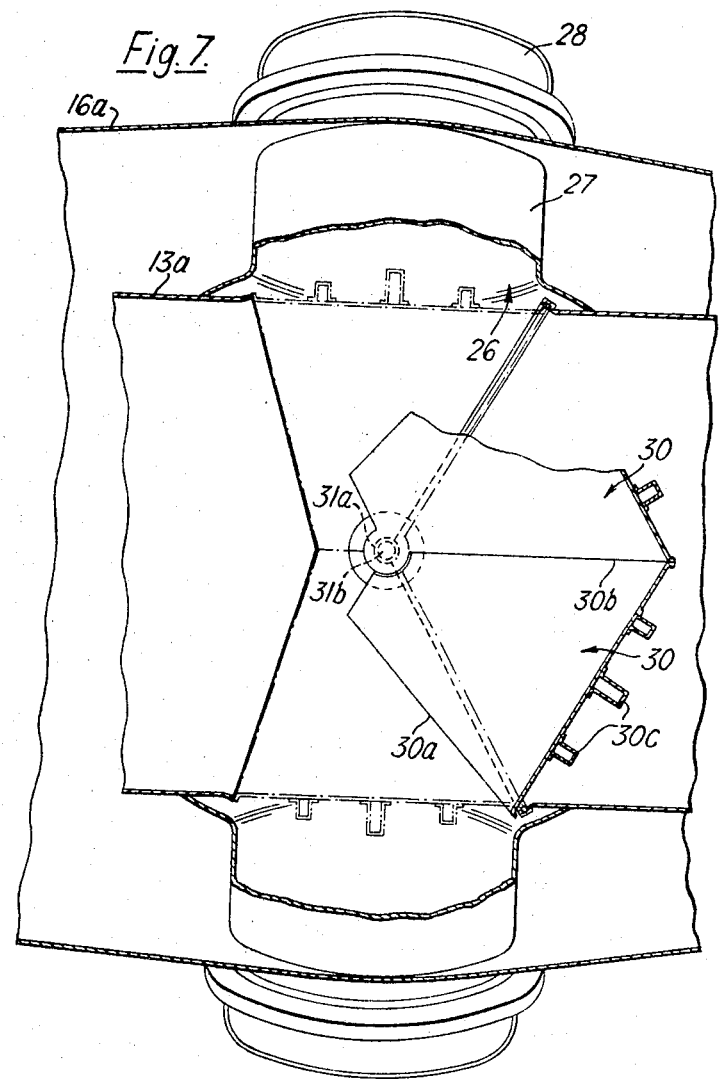
FIGURE 7 is an enlargement of part of FIGURE 2, with portions broken away.

The discharge of the turbine exhaust gas through the outlets 26 is controlled by a pair of valve members 30 mounted on concentric vertical trunnions 31a, 31b (FIGURE 7). Each valve member is a fragment of a cylinder, with an oblique upstream edge 30a, and an oblique downstream edge 30b, and with external stiffeners 30c. A pair of fluid-actuated rams 32 (FIGURES 2 and 3) connected by links 32c to lever arms 32a, 32b on the trunnions 31a, 31b serve to pivot the valves 30, each through 60°, from a position, shown in chain lines in FIGURE 7, in which they form part of the jet pipe wall 13a, thus closing the outlets 26 and permitting the exhaust gas to pass to the rear nozzle 14, to a position, shown in solid lines in FIGURE 7, in which they come together in visor fashion to uncover the outlets 26, block the flow through the jet pipe and divert it to escape through the outlets 26, branch ducts 27 and nozzles 28. In the chain-line positions, the edges 30a and 30b make sealing engagement respectively with the downstream edge of an upstream portion of the jet pipe and with the upstream edge of a downstream portion of the jet pipe. In the solid-line position, the edges 30a make sealing engagement with the upstream edge of the downstream portion of the jet pipe, and the edges 30b make sealing engagement with one another.

Since the presence of the ducts 27 restricts the effective cross-sectional area of the by-pass duct, compensation is made by giving the adjacent portion of the by-pass duct a slightly divergent-convergent shape at 16b.

For vertical take-off, the engine is operated with the four nozzles 23, 28 rotated to their downward position and the flaps 25 and the valve members 30 adjusted to their obstructive positions shown in solid lines in FIGURES 5 and 7. For maximum thrust, the auxiliary combustion system 19, 20 in the upstream portion of the by-pass duct is brought into use. As a result, the power plant discharges a pair of downward jets of combustion gas from the front nozzles 25 and a pair of downward jets of turbine exhaust gas from the rear nozzles 28. In the aircraft to which FIGURES 1 to 7 relate, the pod and engine shown in FIGURE 1 are at one side of the aircraft, and there is a similar pod symmetrically disposed on the other side of the aircraft. The resultant upthrust from the two engines raises the aircraft into the air. Preferably the nozzle locations and the magnitudes of the thrusts from the individual downward jets are designed to ensure that the resultant upthrust passes through or near the centre of gravity of the aircraft so as to promote stability about the pitch axis. In FIGURE 1 the position of the centre of gravity of the whole aircraft, as seen in side elevation, is indicated at C.G. After the vertical take-off, the nozzles of each pair in each engine are rotated in unison rearwards to obtain forward thrust and air speed, and, after sufficient aerodynamic lift has been obtained from the wings of the aircraft, the flaps 25 and valve members 30 are adjusted to the positions shown in chain lines in FIGURES 5 and 7, so as to close the outlets 21, 26 and permit discharge of the by-pass gas and turbine exhaust gas from the coaxial nozzles 17, 14 respectively, the area of the nozzle 17 being set at its maximum. Thereafter the fuel supply to the auxiliary combustion system 19, 20 is cut off and the area of the nozzle 17 reduced accordingly by the operation of the shroud 18, so that the aircraft may cruise economically on its co-axial jets of by-pass air and engine exhaust gas.

Prior to vertical landing approach, the flaps 25 and valve members 30 are pivoted to their obstructive positions, and the forward propulsion is taken over by the four rearward pointing nozzles 23, 28. The nozzles are then rotated downwards and forwards to brake the aircraft. As the falling airspeed approaches the stalling speed of the aircraft, the four nozzles are rotated to their downward position so that the aircraft becomes supported by the upthrust of the nozzle jets. If necessary the auxiliary combustion system may be brought into use to increase the upthrust. The thrust is then reduced to provide a controlled descent to the ground, whereupon the nozzles may be rotated rearwards for taxiing or to avoid ground erosion.

Figure 8:
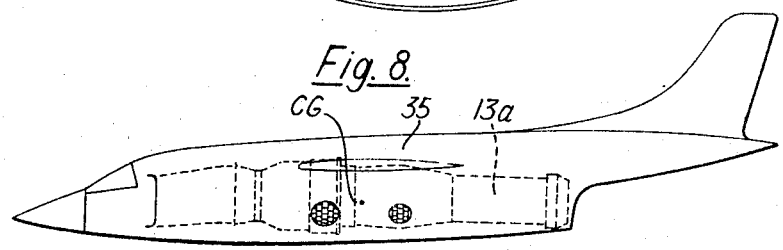
FIGURE 8 is a side view of a similar power plant housed in the fuselage of another aircraft.

As shown in FIGURE 8, in the case of a single-engine installation in the fuselage 35 of an aircraft, the whole power plant including the rotatable nozzles is completely housed in the fuselage, thus reducing drag. The engine is the same as in FIGURES 1 to 7, except that the rear part of the jet pipe 13a is elongated. Again the position of the centre of gravity of the whole aircraft is indicated at C.G. Preferably the discharge openings in the fuselage opposite the rotatable nozzles are provided with doors so that the openings can be closed when not in use.

In the example shown in FIGURES 9 to 11, which is limited in its application to a S.T.O.L. aircraft, the two pairs of downward branch ducts and rotatable nozzles of the example shown in FIGURES 1 to 7 are replaced by a single ventral discharge duct 36 controlled by flaps 25, and a single ventral discharge duct 37 controlled by a valve member 38, both ventral ducts 36, 37 being fixedly inclined downwards and rearwards, the direction of discharge being indicated at W, to provide upthrust with a minor component of forward thrust. The flaps 25 are the same as those shown in FIGURES 1 to 7. The single valve member 38 resembles one of the pair of valve members 30 in construction, but is of symmetrical shape and subtends a greater angle at its pivot axis. The pivot axis of the valve member 38 is horizontal and the valve member is movable through 90°, as indicated in FIGURE 9. In the upstream part of the by-pass duct 16 there is an auxiliary combustion system 19, 20, as in FIGURES 1 to 7. In operation, the aircraft takes off after a short ground run by discharging combustion gas from the by-pass duct through the forward ventral duct 36, and the turbine exhaust gas through the rearward ventral duct 37. After take-off and when sufficient aerodynamic lift from the wings has been obtained, the flaps 25 and the valve 38 controlling the discharge through the ventral ducts are moved to close the bottom outlet 39 in the wall of the by-pass duct and the bottom outlet 40 in the wall of the jet pipe, whereupon the by-pass flow and engine flow are discharged rearwards from co-axial rear nozzles 17, 14 for forward propulsion in the normal manner. The auxiliary combustion system 19, 20 may then be put out of action. The ventral ducts may be closed by external doors 36a, 37a when not in use. When making a relatively slow landing approach, the flaps and valve are again moved, so that the flows are discharged through the ventral ducts to provide the necessary lifting thrust as well as a minor component of forward thrust. During landing the auxiliary combustion system may be brought into operation again if necessary.

FIGURE 12 shows an engine of "aft fan" type, in which the additional compressor 41 in the by-pass duct is around the engine turbine 42. The blades of the turbine and of the additional compressor are tiered, that is to say the compressor blades are secured to the outer ends of the turbine blades. With this arrangement, the alternative outlet or outlets from the by-pass duct may be placed either upstream or downstream of the alternative outlet or outlets from the jet pipe. FIGURE 12 shows the latter arrangement, with a pair of front nozzles 43 which can receive exhaust gas under the control of valve members 44, and a pair of rear nozzles 45 which can receive air or combustion gas from the by-pass duct under the control of flaps 46. The valve members 44 are like the valve members 30, and the flaps 46 are like the flaps 25, as shown in FIGURES 1 to 7. There is an auxiliary combustion system 47, like the system 19, 20 in FIGURE 2, in the by-pass duct just upstream of the rear nozzles 45.

In each example, the thrust may be further increased by providing a re-heat combustor in the jet pipe upstream of the valve-controlled outlet or outlets, as indicated at 41 in FIGURE 2.

We claim:
1. An aircraft power plant comprising a gas turbine engine including a jet pipe for the turbine exhaust gas which terminates in a jet nozzle for normal forward propulsion, an axial flow additional compressor driven by the engine, a by-pass air duct at least partly surrounding the engine and its jet pipe and communicating at its upstream end with the additional compressor and arranged to discharge through its downstream end for normal forward propulsion, an auxiliary combustion system for burning fuel in the air in the by-pass duct, at least one alternative outlet in the outer wall of the by-pass duct downstream of the auxiliary combustion system and communicating with a branch discharge duct, valve means movable between a position in which it closes the alternative outlet and a position in which it diverts the flow from the by-pass duct through the alternative outlet, at least one further alternative outlet in the wall of the jet pipe and communicating with a further branch discharge duct, and further valve means movable between a position in which it closes the further alternative outlet and a position in which it diverts the turbine exhaust gas through the further alternative outlet.

2. A power plant according to claim 1, in which there are a pair of alternative outlets from the by-pass duct, and a pair of alternative outlets from the jet pipe.

3. A power plant according to claim 1 in which the alternative outlets lead to means for deflecting the discharge between downward and rearward directions.

4. A power plant according to claim 3, in which the means for deflecting the discharges are rotatable nozzles.

5. A power plant according to claim 4, in which each rotatable nozzle is in the form of a rotatable ring carrying a grid of deflector vanes.

6. A power plant according to claim 5, encased in a wall, the outer faces of the rings being substantially flush with the wall.

7. A power plant according to claim 1, in which the valve means associated with the by-pass duct is constituted by an annular series of interconnected flaps which are hinged at their downstream ends to the outer wall of the by-pass duct.

8. A power plant according to claim 7, in which each flap is arcuate in transverse section and has one side edge joggled and overlapping an adjacent flap.

9. A power plant according to claim 7, in which the flaps are controlled by mechanism comprising a motor acting on an endless chain arranged to drive a circumferential series of sprockets which actuate a series of screws, each of which is linked to a flap.

10. A power plant according to claim 1, in which the valve means associated with the jet pipe is a pair of valve members, pivoted on a common vertical axis, each valve member being a fragment of a cylinder.

11. A power plant according to claim 1, encased in a wall, with an opening in the wall associated with each of the alternative outlets of the engine, and external doors arranged to close the openings when the alternative outlets are not in use.

References Cited by the Examiner
UNITED STATES PATENTS

| | | | |
|---|---|---|---|
| 3,068,646 | 12/1962 | Fletcher | 60—35.54 X |
| 3,097,484 | 7/1963 | Andre et al. | 60—35.54 |
| 3,117,750 | 1/1964 | Snell. | |
| 3,130,543 | 4/1964 | Oldfield et al. | 60—35.54 |
| 3,167,911 | 2/1965 | Sandre. | |
| 3,181,293 | 5/1965 | Orchard et al. | 60—35.55 |

FOREIGN PATENTS 881,967 11/1961 Great Britain.

MARK NEWMAN, *Primary Examiner.*

CARLTON R. CROYLE, *Examiner.*